(No Model.)

T. NAISH.
Drilling Machine.

No. 234,603.                   Patented Nov. 16, 1880.

WITNESSES:
N. B. Brown
Amos W. Hart

INVENTOR:
Theo. Naish
BY
ATTORNEYS.

UNITED STATES PATENT OFFICE.

THEODORE NAISH, OF BIRMINGHAM, COUNTY OF WARWICK, ENGLAND.

DRILLING-MACHINE.

SPECIFICATION forming part of Letters Patent No. 234,603, dated November 16, 1880.

Application filed August 30, 1880. (No model.)

*To all whom it may concern:*

Be it known that I, THEODORE NAISH, of Birmingham, in the county of Warwick, England, have invented a new and useful Improvement in Drilling-Machines; and I do hereby declare that the following is a full, clear, and exact description of the same.

My invention relates to an improved variable feed for rock and other drills. I employ two friction-disks, connected respectively with a shaft and the drill, which are arranged at right angles to each other, the edge of one disk working in frictional contact with the face of the other, but made adjustable along its shaft to vary its distance from the drill, so as to vary the rapidity of motion of the driven wheel.

Figure 1:
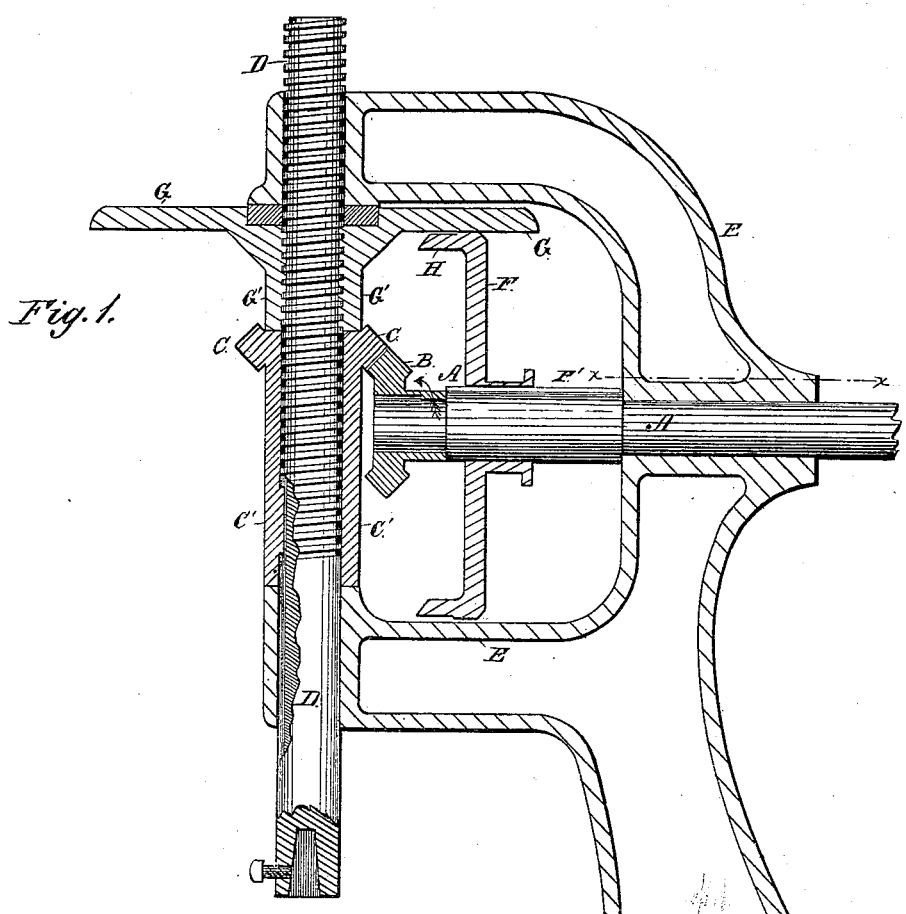
Figure 2:
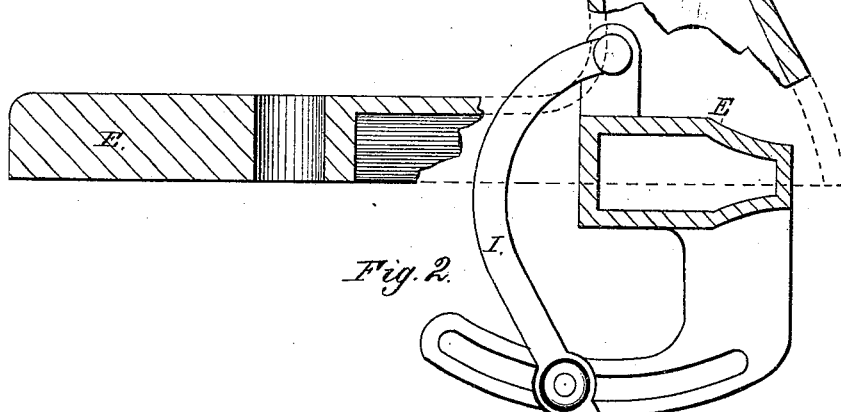

In accompanying drawings, Figure 1 is a vertical section of my improved drilling-machine. Fig. 2 is a sectional view on line $x\, x$, Fig. 1, showing the shipping-lever.

The shaft A is caused to revolve by a pulley fixed on it. By its revolution it turns the two miter-wheels B and C. C has a long boss, C′, inside of which is a feather working in a slot in the drill-spindle D, so that the said spindle is caused to revolve with C′, but is able to move lengthwise therein. All this is of the ordinary construction.

E represents the frame of the machine. On the shaft A is a disk or wheel, F, which is compelled to revolve with the shaft A by a feather, F′, and a slot, but movable lengthwise of that shaft. The periphery of the disk or wheel F rotates in contact with the face of the disk or wheel G and causes it (G) to revolve. The disk or wheel G has a boss, G′, inside of which a female screw is cut, and this is threaded onto the male screw cut on the drill-spindle D.

The action is as follows: The shaft A, revolving in the direction of the arrow, sets the drill-spindle D in motion. It (A) also rotates the disk or wheel F. Assuming the thread on the top of the drill-spindle D to be right-handed, if the contact of F and G be at the point H, where the two diameters of F and G are equal no vertical movement of the drill-spindle will result, because for every one revolution of the drill-spindle D the disk or wheel G will also make one revolution. If, however, the disk or wheel F be moved along the shaft A by means of the lever I to a greater distance than H from the axis of the disk or wheel G, so that the circumference or circle of contact with G is greater than the circumference of F, the disk or wheel G will rotate slower than the drill-spindle D, which, by the rotation of its screw in G′, will have imparted to it a downward or feeding motion. On the other hand, if the contact of F and G be at some point between H and the axis of G, the disk or wheel G will be caused to revolve faster than the drill-spindle D and cause ascension or return movement of that spindle, thus taking off the feed and lifting the spindle to any required position.

The form, arrangement, and dimensions of the apparatus may obviously be varied to suit circumstances without departure from the essential characteristics of my invention. Thus, by way of example, I may mention that the shaft A may be caused to revolve in an opposite direction to that above indicated, or the screw on the spindle D may be a left-handed one, and so on.

What I claim as new is—

1. In a drilling-machine, the combination, with a drill-spindle and a driving-shaft geared together, of the friction-disk G and wheel F, working in frictional contact, the latter revolving with but adapted to slide lengthwise on said driving-shaft, all as shown and described.

2. In a drilling-machine, the arrangement, in combination with a shaft, A, miter-wheels B C, and a drill-spindle, D, of a disk or wheel, F, keyed on the said shaft A, and another disk or wheel, G, having an enlargement or boss, G′, with a female screw-thread, in which fits a corresponding screw on the drill-spindle D, all substantially as described, for the purposes specified.

THEODORE NAISH.

Witnesses:
WILLIAM PIERCE,
JOHN FITZSIMONS.